United States Patent
Xu

(10) Patent No.: US 9,604,280 B2
(45) Date of Patent: *Mar. 28, 2017

(54) WORKING ADDITIVELY MANUFACTURED PARTS

(71) Applicant: United Technologies Corporation, Farmington, CT (US)

(72) Inventor: JinQuan Xu, East Greenwich, RI (US)

(73) Assignee: United Technologies Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/272,033

(22) Filed: Sep. 21, 2016

(65) Prior Publication Data

US 2017/0008080 A1  Jan. 12, 2017

Related U.S. Application Data

(63) Continuation of application No. 14/683,401, filed on Apr. 10, 2015, now Pat. No. 9,463,506.

(Continued)

(51) Int. Cl.

| B22D 23/06 | (2006.01) |
|---|---|
| B22C 7/02 | (2006.01) |
| B22F 3/105 | (2006.01) |
| B22F 3/24 | (2006.01) |
| B22F 5/00 | (2006.01) |
| B22C 9/06 | (2006.01) |
| B23K 15/00 | (2006.01) |
| B23K 26/342 | (2014.01) |
| B23K 26/70 | (2014.01) |
| B33Y 10/00 | (2015.01) |
| B33Y 80/00 | (2015.01) |
| B22D 29/00 | (2006.01) |

(52) U.S. Cl.
CPC .............. *B22D 23/06* (2013.01); *B22C 9/061* (2013.01); *B22C 9/068* (2013.01); *B22D 29/00* (2013.01); *B22F 3/1055* (2013.01); *B22F 3/24* (2013.01); *B22F 5/00* (2013.01); *B23K 15/0086* (2013.01); *B23K 26/342* (2015.10); *B23K 26/70* (2015.10); *B33Y 10/00* (2014.12); *B33Y 80/00* (2014.12); *B22F 2003/248* (2013.01); *B22F 2998/10* (2013.01)

(58) Field of Classification Search
CPC .... B22C 7/02; B22C 9/02; B22C 9/04; B22C 9/043; B22D 23/06
USPC ................... 164/9, 24, 34, 35, 80, 516–529
See application file for complete search history.

(56) References Cited

U.S. PATENT DOCUMENTS

| 4,574,451 A | 3/1986 | Smashey et al. |
|---|---|---|
| 5,868,194 A | 2/1999 | Horwood |

(Continued)

OTHER PUBLICATIONS

Measurements and Predictions of Surface Roughness Effects on Turbine Vane Aerodynamics, R.J. Boyle, NASA Glenn Research Center, ASME Turbo Expo 2003 (Jun. 16-19, 2003), 13 pages.

*Primary Examiner* — Kevin E Yoon
(74) *Attorney, Agent, or Firm* — Kinney & Lange, P.A.

(57) ABSTRACT

A method of working an additively manufactured part includes applying a layer of wax to a part manufactured with an additive manufacturing process. Then a mold is formed over the layer of wax on the part. The wax is then removed from between the mold and the part. The part is then melted in the mold, and then the part is re-solidified in the mold. Finally, the mold is removed.

18 Claims, 1 Drawing Sheet

Related U.S. Application Data

(60) Provisional application No. 61/979,776, filed on Apr. 15, 2014.

(56) References Cited

U.S. PATENT DOCUMENTS

| | | |
|---|---|---|
| 7,216,689 B2 | 5/2007 | Verner et al. |
| 7,413,001 B2 | 8/2008 | Wang et al. |
| 8,383,028 B2 * | 2/2013 | Lyons |
| 9,463,506 B2 * | 10/2016 | Xu ........................ B22D 23/06 |
| 2006/0231975 A1 | 10/2006 | Teulet |
| 2010/0025001 A1 | 2/2010 | Lee et al. |
| 2013/0026338 A1 | 1/2013 | Castle et al. |
| 2013/0266816 A1 | 10/2013 | Xu |
| 2013/0280091 A1 | 10/2013 | Propheter-Hinckley et al. |

* cited by examiner

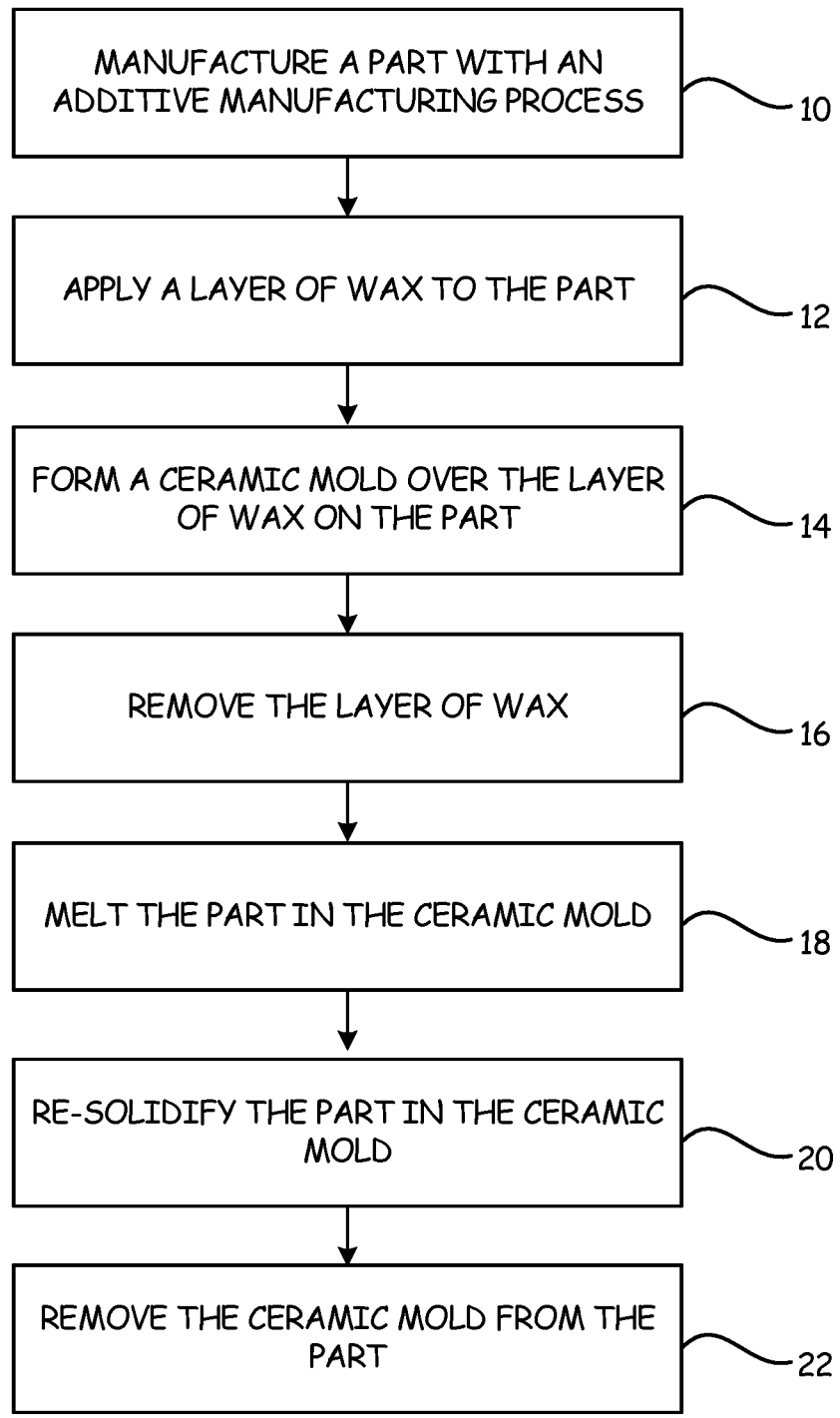

WORKING ADDITIVELY MANUFACTURED PARTS

This application is a continuation of U.S. application Ser. No. 14/683,401, now issued as U.S. Pat. No. 9,463,506, filed on Apr. 10, 2015, and entitled "WORKING ADDITIVELY MANUFACTURED PARTS," which claims priority to U.S. Provisional Application No. 61/979,776, filed on Apr. 15, 2014, and entitled "WORKING ADDITIVELY MANUFACTURED PARTS."

BACKGROUND

The present invention relates to working additively manufactured parts, and in particular, to melting and re-solidifying additively manufactured parts.

Additive manufacturing is becoming increasingly popular as a means for manufacturing parts with complex shapes. Additive manufacturing allows a part to be manufactured layer-by-layer, which allows complex design features to be included in the part design when it was previously impossible. Additive manufacturing processes generally include the following steps. First, a three-dimensional model of the part is created using computer software. The computer model is then sliced into a plurality of layers. Information about the first layer is then transmitted to an additive manufacturing machine. The additive manufacturing machine then builds the first layer of the part. Information about the second layer is then transmitted to the additive manufacturing machine and the additive manufacturing machine builds the second layer of the part on top of the first layer. This process continues layer-by-layer to generatively build a part.

One challenge that is faced when using additive manufacturing processes is controlling the surface finish and crystallization of the part. The surface finish of an additively manufactured part typically has an average surface roughness $R_a$ between 175 microinches (4.4 micrometers) and 600 microinches (15.2 micrometers). This surface finish is unsuitable for parts that are used as aerodynamic parts, for instance vanes located in a gas turbine engine. Rough aerodynamic surfaces increase turbulence and decrease the effectiveness of the aerodynamic parts. Further, it is difficult to control the overall crystallization of additively manufactured parts due to the layer-by-layer construction of the parts. Crystallization of a part can affect the mechanical, optical, and electrical properties of the part.

SUMMARY

A method of working an additively manufactured part includes applying a layer of wax to a part manufactured with an additive manufacturing process. Then a mold is formed over the layer of wax on the part. The wax is then removed from between the mold and the part. The part is then melted in the mold, and then the part is re-solidified in the mold. Finally, the mold is removed.

A method of manufacturing a part includes manufacturing a part with an additive manufacturing process, wherein the part as additively manufactured has a high surface roughness. A layer of wax is applied to the part and then a ceramic mold is formed over the layer of wax on the part. After the ceramic mold is formed, the layer of wax is removed. Next the part and the ceramic mold are heated to melt the part. The part that has been melted is then cooled in the ceramic mold to re-solidify the part. The ceramic mold is then removed from the part, wherein the part as melted and re-solidified has a lower surface roughness than the surface roughness of the part as additively manufactured.

BRIEF DESCRIPTION OF THE DRAWINGS

FIG. 1 is a flowchart showing steps for working an additively manufactured part.

DETAILED DESCRIPTION

In general, the present disclosure is related to working a part that has been manufactured with an additive manufacturing process. Parts that are manufactured with additive manufacturing processes typically have poor surface finish. It is also difficult to control the crystallization of parts as they are manufactured with additive manufacturing processes. To improve the surface finish and crystallization of additively manufactured parts, the parts can undergo steps to work the material and improve the surface finish and crystallization. These steps include applying a layer of wax to the additively manufactured part and then forming a ceramic mold over the wax. The wax is removed and then the part is melted in the ceramic mold. After melting, the part is re-solidified in the ceramic mold and the ceramic mold can then be removed. This improves the surface finish of the part, as the part re-solidifies against the inside of the ceramic mold. Further, the crystallization of the part can be controlled as the part re-solidifies.

FIG. 1 is a flowchart showing steps for working an additively manufactured part. The flowchart includes steps 10-22. Step 10 includes manufacturing a part with an additive manufacturing process. Step 12 includes applying a layer of wax to the part. Step 14 includes forming a ceramic mold over the layer of wax on the part. Step 16 includes removing the layer of wax. Step 18 includes melting the part in the ceramic mold. Step 20 includes re-solidifying the part in the ceramic mold. Step 22 includes removing the ceramic mold from the part.

Step 10 includes manufacturing a part, for example a superalloy part for gas turbine engines, with an additive manufacturing process. The part can be manufactured with any additive manufacturing process known in the art. Additive manufacturing processes manufacture parts layer-by-layer. A typically additive manufacturing process includes the following steps. First, a three-dimensional computer model of the part is created. Next the computer model of the part is sliced into a plurality of layers. Information about the first layer is then transmitted to an additive manufacturing machine, and the machine forms the first layer of the part. Information about the second layer is then transmitted to the additive manufacturing machine, and the machine forms the second layer of the part on the first layer of the part. This process continues, and each successive layer is built upon the previous layer to create a part that has been manufactured layer-by-layer. Any additive manufacturing process can be used to manufacture the part, including direct metal laser sintering, electron beam freeform fabrication, electron-beam melting, selective laser melting, or selective laser sintering. Further, the exact steps taken to generate the additively manufactured part can vary from the typical steps.

Additive manufacturing processes allow parts with complex shapes to be manufactured. A challenge that is faced with current additive manufacturing processes includes controlling the properties of the material the part is made out of during the additive manufacturing process. Parts that are manufactured with additive manufacturing processes typically have poor surface finish. The average surface finish $R_a$ of an additively manufactured part is typically between 175 microinches (4.4 micrometers) and 600 microinches (15.2 micrometers). Further, it is difficult to control the alloy crystallization of parts that are manufactured with additive manufacturing processes. Steps 12-22 work the additively manufactured part created in step 10 to improve the surface finish and crystallization of the part.

Step 12 includes applying a layer of wax to the part. A layer of wax can be applied to the part that has been additively manufactured using any application process known in the art. For example, the wax can be applied by spraying it onto the part or by repeatedly dipping the part in wax to build up the layer of wax on the part. The wax should be applied so that it covers the part and no portion of aerodynamic surfaces of the part should extrude through the wax. The wax as applied will have an average surface roughness $R_a$ of no more than 125 microinches (3.2 micrometers). More specifically, the wax as applied will have an average surface roughness $R_a$ between 60 microinches (1.5 micrometers) and 125 microinches (3.2 micrometers). This is an improved surface finish than the surface finish of the part as additively manufactured.

Step 14 includes forming a ceramic mold over the layer of wax on the part. After the layer of wax has been applied to the part as additively manufactured, a ceramic mold can be formed over the layer of wax on the part. The ceramic mold can be formed using any process known in the art. For example, the ceramic mold can be formed according to investment casting steps. The first step is applying a fine ceramic material to the layer of wax on the part. This can be done by dipping the part with the layer of wax into a slurry of fine ceramic material and letting excess material drip off. The fine ceramic material will create a smooth surface between the layer of wax on the part and an inside of the ceramic mold. The second step is applying a coarse ceramic material to the layer of fine ceramic material on the part. This can be done by dipping the part into a slurry of coarse ceramic material and letting excess material drip off. The third step is allowing the coating to harden. Any suitable ceramic material can be used to create the ceramic mold. Further, the ceramic mold can include any number of ceramic materials and the ceramic materials can be applied to the part in any suitable manner.

Step 16 includes removing the layer of wax. After the ceramic mold has been formed over the layer of wax, the layer of wax can be removed. The layer of wax can be removed using any process known in the art. For example, the layer of wax can be removed by melting it and letting it drain out from between the ceramic mold and the additively manufactured part. To do this, the part with the layer of wax and the ceramic mold can be placed in a furnace or autoclave. As the wax is heated, it melts or vaporizes and can drain out of the ceramic mold. This process will remove a majority of the wax from between the ceramic mold and the additively manufactured part.

The ceramic mold and the additively manufactured part can also be heated to a temperature that is lower than a melting temperature of the additively manufactured part. This removes any residual wax or moisture from between the ceramic mold and the part. Further, it allows the ceramic mold to sinter. After the layer of wax is removed from the ceramic mold, the ceramic mold will have an average internal surface roughness $R_a$ of no more than 125 microinches (3.2 micrometers). More specifically, the ceramic mold will have an average internal surface roughness $R_a$ between 60 microinches (1.5 micrometers) and 125 microinches (3.2 micrometers).

Step 18 includes melting the part in the ceramic mold. After the wax has been completely removed, the part can be melted in the ceramic mold. The part can be melted using any process known in the art. For example, the ceramic mold and the part can be placed in a furnace and heated to a temperature higher than the melting temperature of the part. This will cause the part to melt in the ceramic mold.

The layer of wax that is applied to the part should be a thin layer of wax so that the total volume of wax on the part compared to the volume of the part itself is low. When the layer of wax is removed, there will be a gap left between the part and the ceramic mold. As the part melts, it will fill the gap that was left between the ceramic mold and the part when the layer of wax was removed. To account for this, the size of the part as additively manufactured should be reduced by the volume of the layer of wax that will be applied to the part. This allows the part as melted to have the shape and dimensions that are required for the part in its final form. To ensure that there is enough material to fill the gap left between the ceramic mold and the part when the layer of wax is removed, extra material can be manufactured into the part or extra material can be added to the mold when the part is melted. Extra material can be manufactured on top of a non-aerodynamic portion of the part when the part is additively manufactured. For example, extra material could be manufactured on a root of an airfoil. The extra material that is manufactured on the part can be equal to the volume of the layer of wax, so that when the part is melted it can completely fill the gap between the ceramic mold and the part.

Step 20 includes re-solidifying the part in the ceramic mold. After the part has been melted, it can be re-solidified in the ceramic mold. The part can be re-solidified using any process known in the art. For example, the ceramic mold and the melted part can cool naturally. Alternatively, the ceramic mold and the melted part can be placed on a chill block to control the cooling of the part. Using a chill block, or other directional solidification technologies, to cool the part allows the crystallization of the part to be controlled as it re-solidifies.

Further, when the part is melted, it will fill the gap left between the part and the ceramic mold when the layer of wax was removed. When the part re-solidifies, it will form against the inside surface of the ceramic mold. To ensure accurate shape and dimensions of the part as it re-solidifies, the volume of the gap between the part and the ceramic mold should be minimized. Thus, the volume of the layer of wax that is applied to the part should be minimized. Further, as the part is re-solidified against the inside surface of the ceramic mold it will take on the surface finish of the inside surface of the ceramic mold. This allows the surface finish of the part that has been melted and re-solidified to be improved over the surface finish of the part as additively manufactured.

Step 22 includes removing the ceramic mold from the part. After the part has been re-solidified in the ceramic mold, the ceramic mold can be removed. The ceramic mold can be removed from the part using any process known in the art. For example, the ceramic mold can be removed by hammering, media blasting, vibrating, water jetting, or chemically dissolving. After the ceramic mold is removed, the part that remains is the final part that has been melted and re-solidified.

The part that has been melted and re-solidified will have an improved surface finish than the part as additively manufactured. As discussed above, parts that are manufactured with additive manufacturing processes have a high surface roughness. The average surface roughness $R_a$ of a part as additively manufactured is between 175 microinches (4.4 micrometers) and 600 microinches (15.2 micrometers). In contrast, the average surface roughness $R_a$ of the part that has been melted and re-solidified is between 60 microinches (1.5 micrometers) and 125 microinches (3.2 micrometers). The improved surface roughness of the part that has been melted and re-solidified comes from the layer of wax that is applied to the part. The exterior surface finish of the layer of wax on the part forms the interior surface finish of the ceramic mold. After the layer of wax is removed, the interior surface finish of the ceramic mold will have an average surface roughness $R_a$ normally between 60 microinches (1.5 micrometers) and 125 microinches (3.2 micrometers). As the part is melted, it will fill the gap in the ceramic mold left from the layer of wax that was removed. Then as the part is re-solidified, it will take on the surface finish of the interior surface of the ceramic mold. This will give the part that has been melted and re-solidified an average surface roughness $R_a$ between 60 microinches (1.5 micrometers) and 125 microinches (3.2 micrometers).

Improving the surface finish of the part makes the part suitable for use as an aerodynamic part. For example, the part can be used as an airfoil or a blade outer air seal for a gas turbine engine due to the improved surface finish of the part. Parts that are used as aerodynamic parts need to be smooth to reduce turbulence and increase the efficiency of the air flowing over the part.

After the part is melted, the re-solidification of the part can also be controlled to control the crystallization of the part as it re-solidifies. Crystallization of metallic materials can be controlled with temperature, thus crystallization of the part can be controlled by using a chill block to cool and re-solidify the part. Controlling the crystallization of the part is important, as crystallization of the part can affect the mechanical, optical, and electrical properties of the part. For example, controlling the crystallization of the part to create a single crystal microstructure can increase the strength of the part. A single crystal microstructure will not have any grain boundaries, making the part stronger as there are no boundaries along which a crack can propagate. This makes the part that has been melted and re-solidified suitable for use in settings that require high strength, for example as a part in a gas turbine engine. For similar reasons, controlling the crystallization of the part can create a component with columnar grain microstructure.

Possible Embodiments

The following are non-exclusive descriptions of possible embodiments of the present invention.

A method of working an additively manufactured part includes applying a layer of wax to a part manufactured with an additive manufacturing process; forming a mold over the layer of wax on the part; removing the layer of wax between the mold and the part; melting the part in the mold; re-solidifying the part in the mold; and removing the mold.

The method of the preceding paragraph can optionally include, additionally and/or alternatively, any one or more of the following features, configurations, and/or additional components.

The part is manufactured with an additive manufacturing process selected from the group consisting of direct metal laser sintering, electron beam freeform fabrication, electron-beam melting, selective laser melting, selective laser sintering, and combinations thereof.

The part has an aerodynamic surface and the layer of wax that is applied to the part fully covers the aerodynamic surface of the part so that no portion of the aerodynamic surface of the part extrudes through the layer of wax.

Interior surfaces of the mold have an average surface roughness $R_a$ equal to or less than 125 microinches (3.2 micrometers).

Interior surfaces of the mold have an average surface roughness $R_a$ between 60 microinches (1.5 micrometers) and 125 microinches (3.2 micrometers).

The part is re-solidified on a chill block to control the crystallization of the part as it re-solidifies.

The crystallization of the part is controlled so that the part has a single crystal microstructure or a columnar grain microstructure when it has fully re-solidified.

The part that has been re-solidified has an average surface roughness $R_a$ between 60 microinches (1.5 micrometers) and 125 microinches (3.2 micrometers).

A method of manufacturing a part includes manufacturing a part with an additive manufacturing process, wherein the part as additively manufactured has a high surface roughness; applying a layer of wax on the part; forming a ceramic mold over the layer of wax on the part; removing the layer of wax; heating the part and the ceramic mold to melt the part; cooling the part that has been melted in the ceramic mold to re-solidify the part; and removing the ceramic mold from the part, wherein the part as melted and re-solidified has a lower surface roughness than the surface roughness of the part as additively manufactured.

The method of the preceding paragraph can optionally include, additionally and/or alternatively, any one or more of the following features, configurations, and/or additional components.

The layer of wax applied to the part has a lower surface roughness than the surface roughness of the part as additively manufactured.

The part as additively manufactured has an average surface roughness $R_a$ between 175 microinches (4.4 micrometers) and 600 microinches (15.2 micrometers).

The layer of wax has an average surface roughness $R_a$ between 60 microinches (1.5 micrometers) and 125 microinches (3.2 micrometers).

A majority of the layer of wax is removed by melting the wax and draining it from between the ceramic mold and the part.

The method further includes heating the ceramic mold and the part to a temperature below a melting point of the part to remove any residual wax and sinter the mold.

When the layer of wax is removed, there is a gap left between the ceramic mold and the part with a volume that is equal to the volume of wax on the part.

When the part is manufactured, the size of the part can be reduced by the volume of the layer of wax that will be applied to the part so that when the part is melted and re-solidified it will have dimensions as desired for the part in a final form.

When the part is manufactured, it is manufactured with extra material on a non-aerodynamic portion of the part so that the when the part is melted it will fully fill the gap between the ceramic mold and the part.

The part is melted by heating the part and the ceramic mold to a temperature above a melting point of the part.

The melted part is cooled with a chill block to control the crystallization of the part as it is re-solidified.

The part that has been melted and re-solidified has an average surface roughness $R_a$ between 60 microinches (1.5 micrometers) and 125 microinches (3.2 micrometers).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of working an additively manufactured part, the method comprising:
   applying a coating to a part manufactured with an additive manufacturing process;
   forming a mold over the coating on the part;
   removing the coating between the mold and the part;
   melting the part in the mold;
   re-solidifying the part in the mold; and
   removing the mold.

2. The method of claim 1, wherein the part is manufactured with an additive manufacturing process selected from the group consisting of direct metal laser sintering, electron beam freeform fabrication, electron-beam melting, selective laser melting, selective laser sintering, and combinations thereof.

3. The method of claim 1, wherein interior surfaces of the mold have an average surface roughness $R_a$ equal to or less than 125 microinches (3.2 micrometers).

4. The method of claim 3, wherein interior surfaces of the mold have an average surface roughness $R_a$ between 60 microinches (1.5 micrometers) and 125 microinches (3.2 micrometers).

5. The method of claim 1, wherein the mold that is formed over the part is a ceramic mold.

6. The method of claim 5, wherein the ceramic mold and the part are placed in a furnace and heated to a temperature that is lower than the melting temperature of the part to sinter the mold.

7. The method of claim 6, wherein the ceramic mold and the part are heated in the furnace to a temperature that is greater than the melting temperature of the part to melt the part in the ceramic mold.

8. The method of claim 1, wherein the part is re-solidified on a chill block to control the crystallization of the part as it re-solidifies so that the part has a single crystal microstructure or a columnar grain microstructure when it has fully re-solidified.

9. The method of claim 1, wherein the part that has been re-solidified has an average surface roughness $R_a$ between 60 microinches (1.5 micrometers) and 125 microinches (3.2 micrometers).

10. A method of manufacturing a part, the method comprising:
    manufacturing a part having first dimensions;
    applying a coating on the part, wherein the part together with the coating has second dimensions that are larger than the first dimensions;
    forming a mold over the coating on the part;
    removing the coating;
    heating the part to melt the part;
    cooling the part that has been melted in the mold to re-solidify the part; and
    removing the mold from the part.

11. The method of claim 10, wherein when the coating is removed, there is a gap left between the mold and the part with a volume that is equal to the volume of the coating on the part.

12. The method of claim 11, wherein additional material is added to the mold when the part is melted so that it will fully fill the gap between the mold and the part.

13. The method of claim 11, wherein when the part is manufactured, it is manufactured with extra material on a non-aerodynamic portion of the part so that the when the part is melted it will fully fill the gap between the mold and the part.

14. The method of claim 10, wherein the coating applied to the part has a lower surface roughness than the surface roughness of the part as manufactured.

15. The method of claim 14, wherein the part as manufactured has an average surface roughness $R_a$ between 175 microinches (4.4 micrometers) and 600 microinches (15.2 micrometers).

16. The method of claim 14, wherein the coating has an average surface roughness $R_a$ between 60 microinches (1.5 micrometers) and 125 microinches (3.2 micrometers).

17. The method of claim 14, wherein the part that has been melted and re-solidified has an average surface roughness $R_a$ between 60 microinches (1.5 micrometers) and 125 microinches (3.2 micrometers).

18. The method of claim 10, wherein the part is re-solidified on a chill block to control the crystallization of the part as it re-solidifies so that the part has a single crystal microstructure or a columnar grain microstructure when it has fully re-solidified.

* * * * *